United States Patent [19]

Park

[11] Patent Number: 5,703,669
[45] Date of Patent: Dec. 30, 1997

[54] SUNGLASSES INCLUDING QUICK RELEASE LENS RETAINER #5

[76] Inventor: James S. Park, 2806 S. Summerset Dr., Appleton, Wis. 54915

[21] Appl. No.: 617,298

[22] Filed: Mar. 18, 1996

[51] Int. Cl.$^6$ .................. G02C 1/00; G02C 7/10; G02C 1/04
[52] U.S. Cl. .................. 351/86; 351/44; 351/106; 351/130
[58] Field of Search .................. 351/41, 44, 83, 351/85, 86, 87, 91, 92, 103, 105, 106, 108, 124, 129, 130, 131, 153

[56] References Cited

U.S. PATENT DOCUMENTS

| | | | |
|---|---|---|---|
| 4,674,851 | 6/1987 | Jannard | 351/47 |
| 4,730,915 | 3/1988 | Jannard | 351/47 |
| 4,859,048 | 8/1989 | Jannard | 351/159 |
| 4,951,322 | 8/1990 | Lin | 2/439 |
| 5,182,586 | 1/1993 | Bennato | 351/44 |
| 5,347,323 | 9/1994 | Wilson | 351/44 |
| 5,467,148 | 11/1995 | Conway | 351/85 |
| 5,619,287 | 4/1997 | Tseng | 351/86 |

*Primary Examiner*—Huy Mai
*Attorney, Agent, or Firm*—Donald J. Ersler

[57] ABSTRACT

An interchangeable sunglass system includes a frame, a first arm, a second arm, a quick release lens retainer, a soft nose piece, and a tinted lens. The frame has a first end, a second end, a top surface, and a bottom surface. An angled slot is formed in substantially the length of the bottom surface of the frame to accommodate the quick, and easy change of different tinted lenses. The angled slot allows a the tinted lens to angle inward toward the cheek of the user and allow the bottom of the tinted lens to rest close to the cheeks of the user. The first and second arms are pivotally connected to the frame. The quick release lens retainer includes a stem, a first leg, and a second leg. The stem extends downward from the frame. The soft nose piece is sized to be received between the first and second legs of the quick release lens retainer. Both cross sections of the length and the height of the tinted lens have the shape of a curvature. The tinted lens is removed by compressing the first and second legs of the quick release lens retainer with the thumb and fore finger until the tinted lens can be lifted above the quick release lens retainer. The tinted lens is inserted by compressing the quick release lens retainer and slipping the tinted lens into the angled slot and pushing the tinted lens on to the quick release lens retainer.

5 Claims, 2 Drawing Sheets

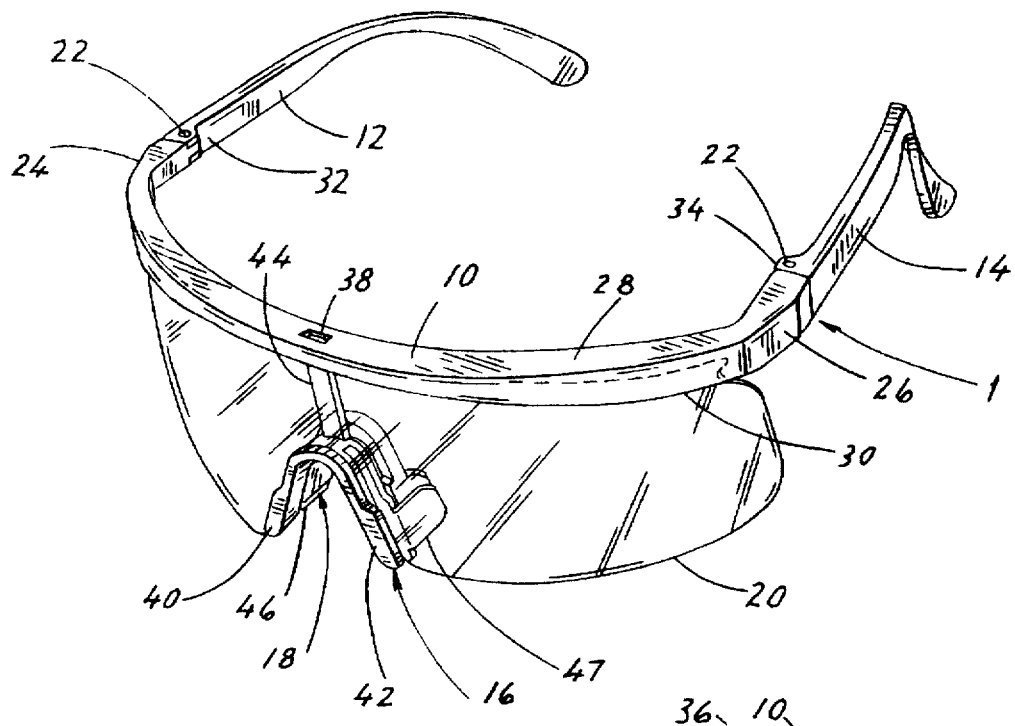
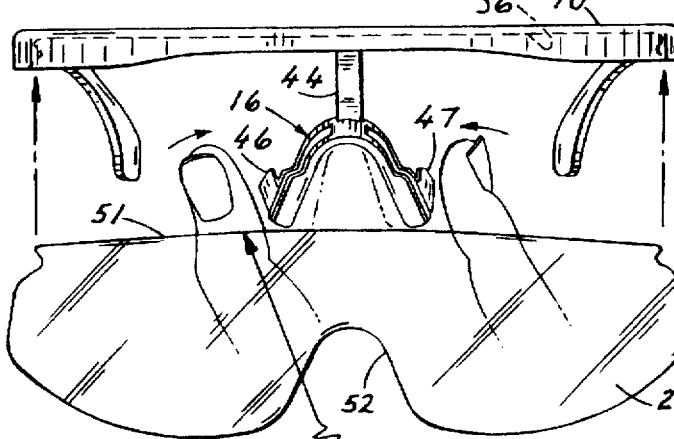
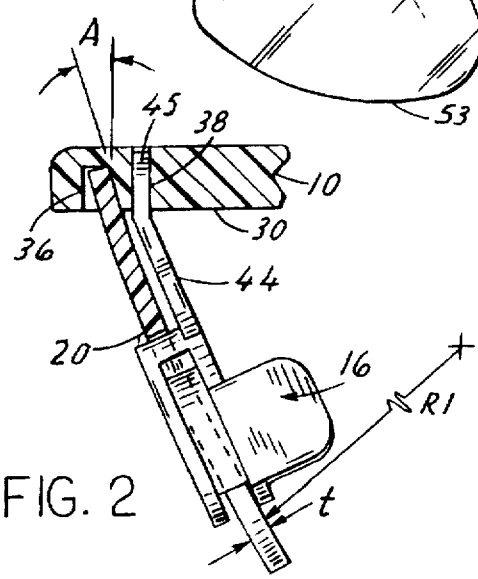
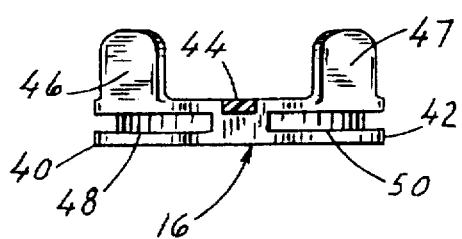

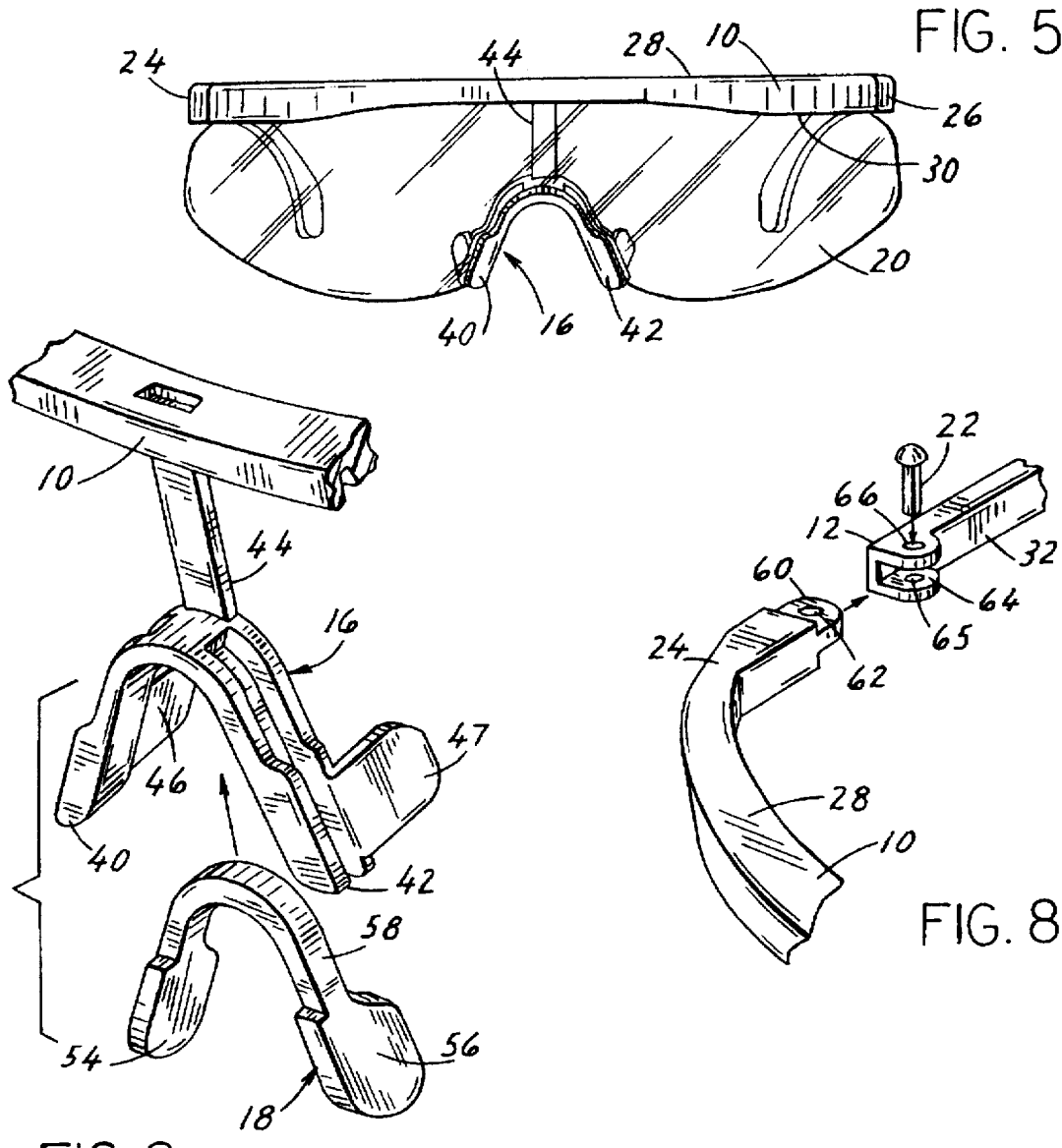
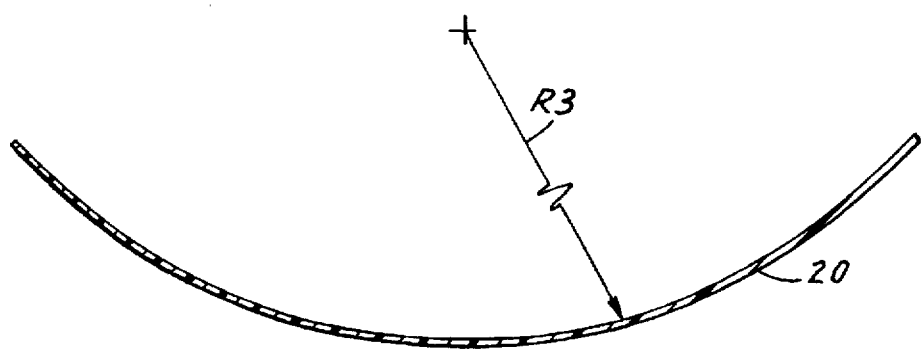

# 5,703,669

SUNGLASSES INCLUDING QUICK RELEASE LENS RETAINER #5

FIELD OF THE INVENTION

The present invention relates generally to sunglasses and more specifically to an interchangeable sunglass system which allows the quick and easy change of many different tinted lenses. The interchangeable sunglass system is also more comfortable, and protects the users eye's better than that of the prior art.

DISCUSSION OF THE PRIOR ART

Sunglasses are usually used to enhance a person's vision during extreme sunlight by filtering uncomfortable and damaging light rays. There are other times when a person may want to enhance their vision during different lighting conditions such as an overcast sky or dusk. The usual green tint of sunglasses may be used, but the user will experience poor visual contrast or may filter too much of the available light. This situation can be remedied by using a different tinted lens which is suitable for a particular lighting condition.

If someone wants sunglasses with optimal contrast for each lighting condition, they must either purchase several pairs of sunglasses, or have several tinted lens. Having several pairs of sunglasses is impractical. Having several tinted lens requires a sunglass frame to be specially designed to provide a quick and easy change of these different tinted lenses.

Further, most sunglasses do not provide adequate support for a soft nose piece. Without adequate support on the outside of a soft nose piece, the soft nose piece must be made of a harder material or the user's nose will distort the soft nose piece's shape, and damage the integrity of the fit. The result of the harder material is a nose piece which is less comfortable to wear.

Additionally, most sunglasses do not provide optimal protection for a user, either above or below the eyes. If a user is fishing, sun glare from the water can strike under the lens and irritate or damage a user's vision. Most sunglasses do not protect the user's eyes from sunlight that comes from above.

Accordingly, there is a clearly felt need in the art for an interchangeable sunglass system which can accommodate the quick and easy change of different tinted lenses; a frame that is designed to protect a user's eyes from sunlight coming from above, and which provides a suitable mounting for the tinted lens; and a quick release lens retainer having projections to support the nose pads.

SUMMARY OF THE INVENTION

The primary objective of the present invention is to provide an interchangeable sunglass system which can accommodate the quick and easy change of different tinted lenses for different lighting conditions; further, an interchangeable sunglass system which has a frame that is designed to protect a user's eyes from light that comes from above, and a quick release lens retainer having projections to support the nose pads.

According to the present invention, an interchangeable sunglass system includes a frame, a first arm, a second arm, a quick release lens retainer, a soft nose piece, and a tinted lens. The frame has a first end, a second end, a top surface, and a bottom surface. An angled slot is formed in substantially the length of the bottom surface of the frame to accommodate the quick and easy insertion, and removal of a plurality of tinted lenses. The first arm has a first end, and a substantial length which is adapted to be retained by a user's ear. The second arm has a first end, and a substantial length which is adapted to be retained by a user's ear. The first end of the first arm is pivotally connected to the first end of the frame. The first end of the second arm is pivotally connected to the second end of the frame.

The quick release lens retainer includes a stem, a first leg and a second leg. A first projection extends outward from the first leg and a second projection extends outward from the second leg. A first groove is formed in the first leg and a second groove is formed in the second leg to retain the tinted lens. The soft nose piece has a first nose pad, a second nose pad, and a connector which joints the first and second nose pads. The soft nose piece is sized to be received between the first and second projections of the first and second legs, respectively. The tinted lens has a thickness, a length and a height. The cross section of the length has the shape of a curvature and the cross section of the height has the shape of a curvature. A cavity is formed in the frame in substantially the middle of the top surface. The cavity extends from the top surface of the frame to the bottom surface of the frame. The cavity is sized to receive the stem of the quick release lens retainer.

Accordingly, it is an object of the present invention to provide an interchangeable sunglass system that has a quick release lens retainer that is quicker and easier to use than that of the prior art.

It is a further object of the present invention to provide an interchangeable sunglass system that protects the user from sun light that comes from above the user's eyes and provides better protection from sun light than that of the prior art.

It is yet another object of the present invention to provide an interchangeable sunglass system with a quick release lens retainer having projections to support the soft nose piece and which provides more comfort than that of the prior art.

It is yet a further object of the present invention to provide an interchangeable sunglass system that protects the user from sun light which comes from below the user's eyes and provides better protection from the sun than that of the prior art.

Finally, it is another object of the present invention to provide an interchangeable sunglass system that has a plurality of different tinted lenses for different lighting conditions which may be quickly and easily changed.

These and additional objects, advantages, features and benefits of the present invention will become apparent from the following specification.

BRIEF DESCRIPTION OF THE DRAWINGS

FIG. 1 is a perspective detail view of an interchangeable sunglass system in accordance with the present invention;

FIG. 2 is a cross sectional detail view of a tinted lens inserted into a frame in accordance with the present invention;

FIG. 3 is a top detail view of a quick release lens retainer in accordance with the present invention;

FIG. 4 is a perspective detail view of a tinted lens being inserted into a frame of an interchangeable sunglass system in accordance with the present invention;

FIG. 5 is a front detail view of an interchangeable sunglass system after a tinted lens has been inserted in the frame in accordance with the present invention;

FIG. 6 is an exploded perspective detail view of how a soft nose piece is inserted into a quick release lens retainer in accordance with the present invention;

FIG. 7 is a cross sectional detail view of the length of a tinted lens in accordance with the present invention; and FIG. 8 is an exploded perspective detail view of the first end of a frame and the first end of a first arm in accordance with the present invention.

DETAILED DESCRIPTION OF THE PREFERRED EMBODIMENTS

With reference now to the drawings, and particularly to FIG. 1, there is shown a perspective view of an interchangeable sunglass system 1 in accordance with the present invention. The interchangeable sunglass system 1 comprises a frame 10, a first arm 12, a second arm 14, a quick release lens retainer 16, a soft nose piece 18, a pivot pin 22, and a tinted lens 20.

The frame 10 has a first end 24, a second end 26, a top surface 28, and a bottom surface 30. The first arm 12 has a first end 32, and a substantial length which is adapted to be retained by a user's ear. The second arm 14 has a first end 34, and a substantial length which is adapted to be retained by a user's ear. The first end 24 of the frame 10 is pivotally connected to the first end 32 of first arm 12 by a rivet 22. The second end 26 of frame 10 is pivotally connected to the first end 34 of the second arm 14 by a rivet 22. The frame 10, first arm 12, and second arm 14 may be molded from a plastic compound.

The tinted lens 20 has a thickness "t", a top edge 51, a bottom edge 53, a height, and a length. The tinted lens 20 may be fabricated from different tinted lens materials that are available from International Polarizers of Marlboro, Mass.

With reference to FIG. 2, a cavity 38 is formed in the frame 10 in substantially the middle of the top surface 28. The cavity 38 extends vertically from the top surface 28 down to the bottom surface 30 of the frame 10. The cavity 38 is sized to receive an angular end 45 of a stem 44 which extends upward from the quick release lens retainer 16. The angular end 45 terminates stem 44 at an obtuse angle such that stem 44 is parallel to angle "A" of an angled slot 36. The stem 44 of quick release lens retainer 16 may be secured in the cavity 38 with cement or by any suitable manufacturing means.

FIG. 2 shows a cross sectional detail view of the height of the tinted lens 20 inserted into the frame 10. The angled slot 36 is formed in the bottom surface 30 of the frame 10. The width of the angled slot 36 is sized to receive the thickness "t" of the tinted lens 20. With reference to FIG. 4, the angled slot 36, the curvature of the height of the tinted lens 20 as defined by radius R1, and the curvature of the top edge 51 as defined by radius R2, causes the tinted lens 20 to rest close to the cheeks of the user, and protect them from sun glare, reflected from water during fishing. The width of the top surface 28, and the bottom surface 30 is wider than structurally required so that a user may be protected from light coming that comes from above the eyes.

With reference to FIGS. 1 & 3, the quick release lens retainer 16 includes a first leg 40, and a second leg 42. A first groove 48 is formed in the first leg 40, and a second groove 50 is formed in the second leg 42. A first projection 46 extends outward from the first leg 40 and a second projection 47 extends outward from the second leg 42. The first groove 48 and the second groove 50 are sized to receive the thickness "t" of tinted lens 20.

FIG. 4 shows a perspective detail view of the tinted lens 20 being inserted into the angled slot 36 in the frame 10. An inverted U shaped notch 52 is formed in substantially the middle of the bottom edge 53 of the tinted lens 20. The inverted U shaped notch 52 is sized to fit over the compressed quick release lens retainer 16. The tinted lens 20 can be fit over the quick release lens retainer 16 when a user's thumb and forefinger compress the first projection 46 and the second projections 47 of the quick release lens retainer 16. The tinted lens 20 is installed into the frame 20 as follows: the top edge 51 of the tinted lens 20 is placed into the angled slot 36 in frame 10. The inverted U shaped notch 52 of tinted lens 20 is placed over the quick release lens retainer 16, and the user releases compression of the first projection 46 and the second projection 47 of the quick release lens retainer 16.

With reference to FIGS. 2 & 3, the thickness "t" of the tinted lens 20 in the area of the inverted U shaped notch 52 will fit into and be retained by first groove 48, and second groove 50 in the quick release lens retainer 16. FIG. 5 shows the interchangeable sunglass system after the tinted lens 20 is installed.

FIG. 6 shows an exploded perspective detail view of how the soft nose piece 18 is inserted inside the quick release lens retainer 16. The soft nose piece 18 comprises a first nose pad 54, a second nose pad 56 and a connector 58 which retains and orients the first nose pad 54, and the second nose pad 56. The soft nose piece 18 is retained in the quick release lens 16 by cementing first nose pad 54 inside the first projection 46 and cementing second nose pad 56 inside the second projection 47 as shown in FIG. 1. The soft nose piece 18 may be molded from a thermoplastic rubber compound.

FIG. 7 shows a cross sectional detail view of the length of a tinted lens 20. The cross section of the length of the tinted lens 20 has the shape of a curvature as defined by a radius R3. The cross section of the height of the tinted lens 20 also has the shape of a curvature as defined by a radius R1 in FIG. 2.

Preferred dimensions are given for the following elements as example, and not by way of limitation. Satisfactory dimensions for the tinted lens 20 are as follows, the thickness "t" of between 0.045–0.080 inches, the radius R1 of between 3.50–4.50 inches, the radius R2 of between 9.00–11.00 inches, and the radius R3 of between 3.50–4.50 inches. The angle "A" of frame 10 is satisfactory between 13–17 degrees.

FIG. 8 is an exploded perspective detail view of the first end 24 of the frame 10 and the first end 32 of the first arm 12. The first end 24 of the frame 10 is terminated with a tongue 60. A hole 62 is formed in the tongue 60 and is perpendicular to top surface 28 of frame 10. The first end 32 of first arm 12 is terminated with a tongue slot 64 which is sized to slidably receive the tongue 60. A top hole 66 and a bottom hole 65 are formed in the first end 32 of first arm 12. Both the top hole 66, and the bottom hole 65 are on the same center line. At assembly, the tongue 60 of the frame 10 is inserted into the tongue slot 64 of the first arm 12; the rivet 22 is inserted through the top hole 66, the bottom hole 65 of the first arm 12 and the hole 62 of the frame 10. The rivet 22 is peened over to retain the first arm 12 and the frame 10 in a pivotal relationship, the result of the assembly is shown in FIG. 1. The first end 34 of second arm 14 and the second end 26 of the frame 10 are mirror images of the first end 24 of the frame 10 and the first end 32 of the first arm 12, respectively.

While particular embodiments of the invention have been shown and described, it will be obvious to those skilled in the art that changes and modifications may be made without departing from the invention in its broader aspects, and therefore, the aim in the appended claims is to cover all such changes and modifications as fall within the true spirit and scope of the invention.

I claim:

1. An interchangeable sunglass system for use in different light conditions comprising:

a frame having a first end, a second end, a top surface, and a bottom surface, said frame having an angled slot which is formed in substantially the length of said bottom surface of said frame, said frame having a cavity which is formed in substantially the middle of said frame;

a first arm having a first end and a length, said first end of said first arm being pivotally connected to said first end of said frame;

a second arm having a first end and a length, said first end of said second arm being pivotally connected with said second end of said frame;

a tinted lens having a top edge and a bottom edge, and an inverted U shaped notch formed at substantially the middle of said bottom edge, said tinted lens fitting into said angled slot of said frame;

a quick release lens retainer having a first leg and a second leg forming an inverted U shaped nose bridge and a stem extending from said inverted U shaped nose bridge, said stem being firmly retained in said cavity, said inverted U shaped notch of said tinted lens fitting over the inverted U shaped nose bridge of said quick release lens retainer and being retained thereby; and wherein said tinted lens is removed from said frame by compressing said first leg and said second leg of said quick release lens retainer with a thumb and a fore finger, and lifting said tinted lens over said quick release lens retainer; and wherein said stem extending from the cavity of said frame and bending at an acute angle from a line perpendicular to said bottom surface of said frame so that said tinted lens being retained by said angled slot and said legs at the same acute angle and substantially parallel with the stem of said quick release lens retainer.

2. The interchangeable sunglass system for use in different light conditions of claim 1, further comprising:

said tinted lens having a thickness, a length and, a height, the cross section of said length having a curvature, the cross section of said height having a curvature, said top edge of said tinted lens having a curvature across the length thereof;

a first groove in said first leg of said quick release tinted lens retainer; and a second groove in said second leg of said quick release lens retainer, the thickness around the circumference of said inverted U shaped notch of said tinted lens fitting into said first and second grooves of said quick release lens retainer, said tinted lens being retained in said frame thereby.

3. The interchangeable sunglass system for use in different light conditions of claim 1, further comprising:

said top surface of said frame being substantially wide such that said top surface of said frame being less than 3/16 of an inch away from the forehead of a user, said top surface of said frame protecting a user's eyes from sunlight that comes from above.

4. The interchangeable sunglass system for use in different light conditions of claim 1, further comprising:

a soft nose piece which is attached to said quick release lens retainer.

5. The interchangeable sunglass system for use in different light conditions of claim 1, further comprising:

a first projection extending outward from said first leg of said quick release lens retainer; and a second projection extending outward from said second leg of said quick release lens retainer.

* * * * *